United States Patent [19]
Brown

[11] Patent Number: 5,189,424
[45] Date of Patent: Feb. 23, 1993

[54] THREE DIMENSIONAL INTERFEROMETRIC SYNTHETIC APERTURE RADAR TERRAIN MAPPING EMPLOYING ALTITUDE MEASUREMENT AND SECOND ORDER CORRECTION

[75] Inventor: William M. Brown, Ann Arbor, Mich.

[73] Assignee: Environmental Research Institute of Michigan, Ann Arbor, Mich.

[21] Appl. No.: 762,923

[22] Filed: Sep. 19, 1991

[51] Int. Cl.[5] .................. G01S 13/90; G01S 15/89
[52] U.S. Cl. ........................................ 342/25; 367/88
[58] Field of Search ........................... 342/25; 367/88

[56] References Cited

U.S. PATENT DOCUMENTS

| | | | |
|---|---|---|---|
| 3,121,868 | 2/1964 | Hausz et al. | 343/5 |
| 3,178,711 | 4/1965 | Case, Jr. | 343/16 |
| 3,228,028 | 4/1966 | Baum et al. | 343/9 |
| 3,603,992 | 9/1971 | Goggins, Jr. | 343/5 R |
| 3,725,915 | 4/1973 | Herman et al. | 343/5 |
| 3,768,096 | 10/1973 | Dentino | 343/7 |
| 3,838,424 | 9/1974 | Goldfischer | 343/8 |
| 3,905,031 | 9/1975 | McCord | 343/5 |
| 4,034,370 | 7/1977 | Mims | 343/5 |
| 4,045,795 | 8/1977 | Fletcher et al. | 343/5 |
| 4,064,510 | 12/1977 | Chabah | 343/7.5 |
| 4,084,158 | 4/1978 | Slawsby | 343/5 |
| 4,134,113 | 1/1979 | Powell | 343/5 |
| 4,163,231 | 7/1979 | Zuerndorfer et al. | 343/5 |
| 4,184,155 | 1/1980 | Silvertson, Jr. | 343/5 |
| 4,280,127 | 7/1981 | Lee et al. | 342/25 |
| 4,321,601 | 3/1982 | Richman | 343/5 |
| 4,325,065 | 4/1982 | Caputi, Jr. | 343/5 |
| 4,355,311 | 10/1982 | Jain | 343/5 |
| 4,546,354 | 10/1985 | Boles | 343/17 |
| 4,546,355 | 10/1985 | Boles | 343/17 |
| 4,551,724 | 11/1985 | Goldstein | 343/5 |
| 4,563,686 | 1/1986 | Boles | 343/17 |
| 4,611,208 | 9/1986 | Kane et al. | 343/5 |
| 4,636,719 | 1/1987 | Zuk et al. | 343/83 |
| 4,723,124 | 2/1988 | Boles | 343/25 |
| 4,727,373 | 2/1988 | Hoover | 343/25 |
| 4,815,045 | 3/1989 | Nakamura | 367/88 |
| 4,866,446 | 9/1989 | Hellsten | 342/25 |
| 4,922,254 | 5/1990 | Schuessler et al. | 342/25 |
| 4,961,075 | 10/1990 | Ward | 342/140 |
| 4,975,704 | 12/1990 | Gabriel et al. | 342/25 |

OTHER PUBLICATIONS

"Studies of Multi-Baseline Spaceborne, Interferometric Synthetic Aperture Radars, Li et al, Proceedings of IGARSS" '87 Symposium, May 18–21, 1987.

*Primary Examiner*—Gilberto Barrón, Jr.
*Attorney, Agent, or Firm*—Krass & Young

[57] ABSTRACT

Synthetic aperture radar data is used in conjunction with altimeter data to produce a terrain map corrected for platform roll angle. The technique uses two synthetic radar antennas and a ranging altimeter placed on an aircraft. The aircraft is moved in a set of substantially parallel flight paths where each flight is directly over the strip of terrain viewed by the synthetic aperture radar of an adjacent flight. During each flight the at least one antenna repeatedly transmits radar signals whose return echoes are received by both the first and second antennas. Conventional synthetic aperture radar processing yields a terrain map uncorrected for roll angle. Altimeter data from an adjacent flight determines the first order corrected aircraft roll angle when the corresponding synthetic radar data was taken. This roll angle is used to correct the height and ground range of nearby points in the uncorrected terrain map. A second order corrected roll angle is determined using the first order corrected terrain map to identify the first return point of the altimeter measurements. The measured altitude is then realigned to the first return point to produce a second order corrected roll angle and a corresponding second order corrected terrain map. The result is a terrain map corrected for aircraft roll angle.

33 Claims, 5 Drawing Sheets

THREE DIMENSIONAL INTERFEROMETRIC SYNTHETIC APERTURE RADAR TERRAIN MAPPING EMPLOYING ALTITUDE MEASUREMENT AND SECOND ORDER CORRECTION

TECHNICAL FIELD OF THE INVENTION

The technical field of this invention is terrain mapping employing synthetic aperture radar.

BACKGROUND OF THE INVENTION

There is a need for inexpensive, quickly formed and accurate terrain elevation maps. It would be helpful it these terrain elevation maps could be constructed from radar sensor data taken from aircraft. The data could be obtained by flying over the area to be mapped while operating the radar sensor. The radar sensor data could then be employed together with the known or measured path of the aircraft to produce the needed terrain elevation map. Synthetic aperture radar would be useful in construction of such terrain elevation maps except for some limitations in the prior art.

In synthetic aperture radar the motion of the aircraft is employed to achieve greater angular resolution than obtainable by antennas that can be mounted on the aircraft. The motion of the aircraft permits formation of a synthetic antenna that is larger in size than the real antenna. This large synthetic antenna has an angular resolution corresponding to the angular resolution of an equally large physical antenna. The aircraft flies in a predetermined path and repeatedly transmits a radar signal. It is typical for this radar signal to be directed to the side of the flight path via a small antenna. This cross track view may be directly perpendicular to the flight path or at some angle less than perpendicular. The same antenna receives return echoes of the transmitted signal.

The return echo signals are processed in two dimensions. The time to receive an echo return from any particular piece of terrain corresponds to its slant range from the aircraft. This range is called slant range because it typically follows a downwardly slanting path from the aircraft to the ground. The echo returns also have differing Doppler frequencies. The motion of the aircraft imparts a Doppler frequency shift in the echo returns from the stationary ground. Areas directly ahead of the aircraft have a maximum closing Doppler frequency, those directly behind have a maximum opening Doppler frequency. Areas at varying angles between these extremes have intermediate Doppler frequencies. The combination of time of return and Doppler frequency permit production of a two dimensional feature map of resolution cells. Plural echo returns can be processed together with the known path and velocity of the aircraft to produce a terrain map.

There is a problem with this technique. This technique produces a position ambiguity. An echo signal with a particular time of return and Doppler frequency does not define a unique location. Regions of echo return times equal within the limits of measurement lie on a spherical shell centered at the antenna location. Regions of Doppler frequencies equal within the limits of measurement lie on a conical shell having its vertex at the antenna and its axis on the velocity vector of the aircraft. The intersection of these regions forms a vertically disposed circular annulus. Actual echo returns can only come from areas illuminated by the transmissions, so that the return areas are further limited to the solid angle cone of the antenna. Still this leaves an ambiguity in the location of the terrain forming the echo return. Terrain features having greater elevations are foreshortened because they have a reduced slant range relative to regions of lower elevation.

Goldstein et al U.S. Pat. No. 4,551,724, issued Nov. 5, 1985 and entitled "Method and Apparatus for Contour Mapping Using Synthetic Aperture Radar" proposes a solution to this terrain elevation ambiguity problem. Goldstein et al employs two synthetic aperture radar antennas disposed a known distance apart on the aircraft. The antennas have the same look angles to cover the same terrain. Each antenna has its data processed in both slant range and Doppler frequency to identify and correlate echo returns from the same portions of terrain in the two antennas. The phase difference between the echo returns of the two antennas for the same resolution cell corresponds to the slant angle to the location producing that echo. Simple trigonometry permits computation of terrain elevation for a particular echo return from the slant angle, the known altitude of the aircraft and the measured slant range.

This technique of Goldstein et al must account for the roll angle of the interferometer baseline. The roll angle of the aircraft is the most common source of interferometer baseline roll, but independent wing motion also contributes. A roll angle change will change the phase difference between the echo returns of the two antennas without changing the slant angle. Goldstein et al proposes directly measuring the aircraft roll angle and providing an elevation computation corrected for this measured roll angle. Goldstein et al does not disclose how the roll angle is to be detected but presumably relies on some measurement at the aircraft. Current technology for such roll angle measurement is believed to be insufficiently accurate to permit construction of accurate terrain maps in this fashion.

SUMMARY OF THE INVENTION

The present application addresses the problem of accurate determination of the interferometer baseline roll angle in synthetic aperture radar terrain mapping. The technique employs two antennas placed a predetermined distance apart on a moving platform, such as an aircraft. These two antennas have the same field of view that is off the axis of motion of the aircraft. Also used is a radiant ranging altimeter, such as a radar or laser altimeter, which repeatedly measures the distance of the aircraft above the terrain.

This invention uses a particular motion of the aircraft. The aircraft moves in a set of substantially parallel flight paths. Each flight path is directly over the strip of terrain viewed by the synthetic aperture radar on an adjacent flight. This insures that altimeter data is taken corresponding to synthetic radar data.

The two antenna synthetic radar system is used generally in the manner taught in the Goldstein et al patent. During each flight the first antenna repeatedly transmits radar signals. Both the first and second antennas receive return echoes. These are processed conventionally to yield slant range and Doppler frequency data for plural resolution cells. The complex image data for corresponding resolution cells is interfered to obtain the difference in phase between the two antennas. This data is employed as taught in the Goldstein et al patent to produce a terrain map uncorrected for interferometric baseline roll.

This uncorrected terrain map is corrected using the altimeter data. The uncorrected terrain map data from one flight are matched with the altimeter data taken during an adjacent flight. This permits the altimeter data to be used to determine the interferometer baseline roll angle when the corresponding synthetic radar data was taken. Perturbations in the interferometer baseline orientation are primarily due to roll of the aircraft. However, other wing movements also change the orientation of the interferometer baseline. The technique of this invention directly measures changes in the orientation of the interferometer baseline whatever the cause. This roll angle measure is then used to correct the height and ground range of points in the corresponding swath of cross track resolution cells in the uncorrected terrain map. This correction for roll angle is made for the entire flight path based upon the altimeter measurements in the adjacent flight path. This process is then repeated for other adjacent flight paths. The result is a terrain map corrected for interferometer baseline roll angle in a manner more accurate than can be obtained by direct measurement of the roll angle.

The present invention also involves a second order correction of the roll angle. The first order corrected terrain map is employed along with the beam width of the radiant ranging altimeter to determine the point of first return of the radiant ranging altimeter. This point need not be the nadir. Depending upon the terrain contour the point of first return may be ahead of, on either side of or behind the path of aircraft travel. The aircraft roll angle corrections and the computation of the terrain map are realigned taking into the account the actual altitude measurement made by the radiant ranging altimeter. The thus corrected terrain map is an even more accurate indication of the actual terrain contour.

The particular adjacent flights may be made at a substantially constant altitude. Alternately, the roll angle determination can be corrected for any difference in altitude between the flight paths.

In order to reduce noise in the altimeter data it can be time averaged. This averaging should take place over a time small in relation to the periodicity of altitude relative to the speed of the aircraft.

The synthetic radar data, the altimeter data, and contemporaneous position data may be recorded on the aircraft. This permits formation of the corrected terrain map off the aircraft. This may be useful to reduce the necessary equipment to be carried aboard the aircraft. In addition the corrected terrain map can be produced using a general purpose computer that need not withstand the rigors of aircraft flight.

BRIEF DESCRIPTION OF THE DRAWINGS

These and other objects and aspects of the present invention will become clear from the following description of the invention, in which.

DETAILED DESCRIPTION OF THE PREFERRED EMBODIMENTS

Figure 1:
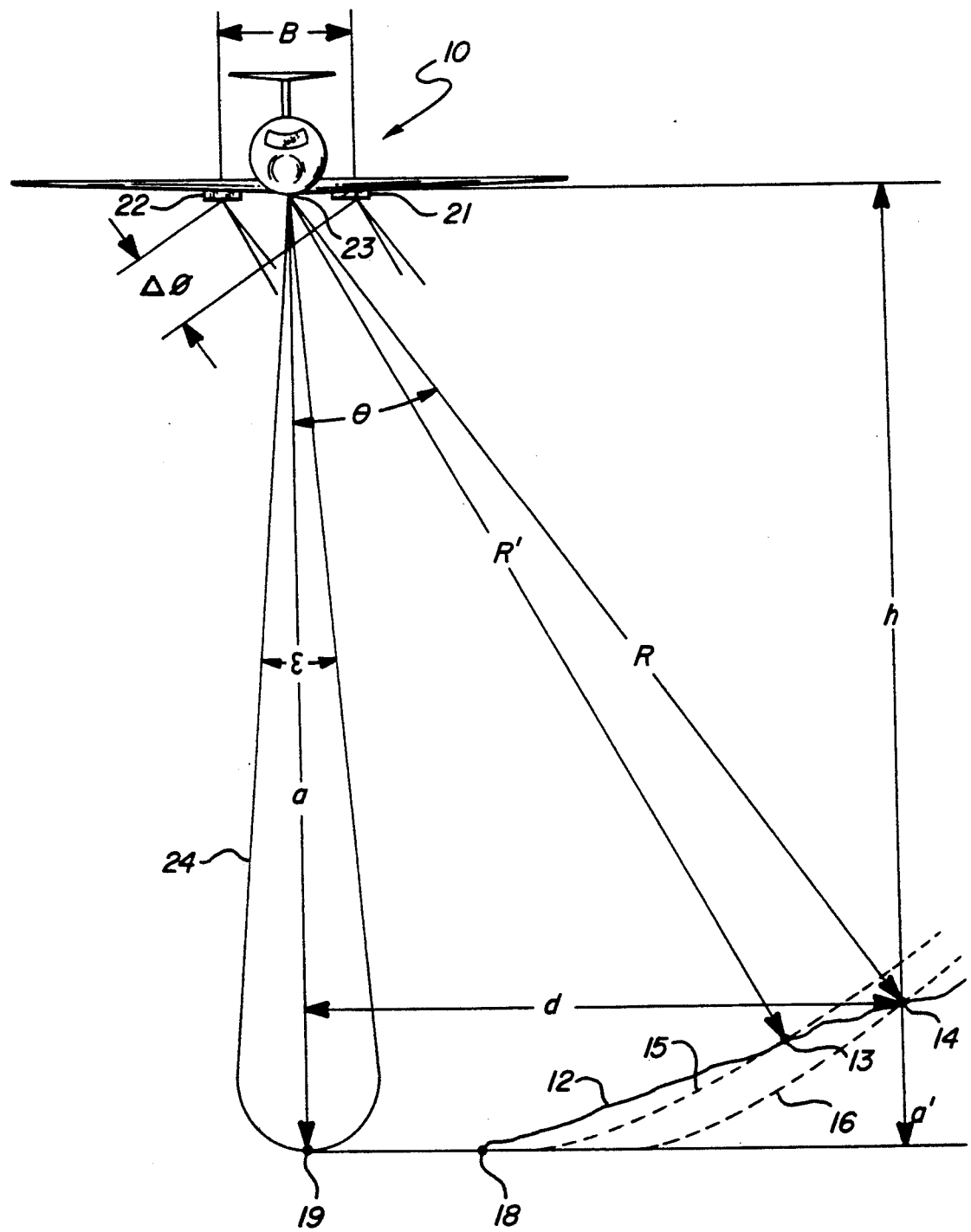
FIG. 1 illustrates the principles of operation of the synthetic aperture radar in accordance with this invention.

FIG. 1 illustrates the operation of the three dimensional synthetic aperture radar terrain mapping technique of this invention. Aircraft 10 is illustrated as moving out of the plane of the illustration toward the viewer. Aircraft 10 includes two synthetic aperture radar antennas 21 and 22. The two antennas 21 and 22 are separated by a known distance B. These two antennas 21 and 22 each have the major lobe of their radiation response directed across the path of aircraft 10. In particular, antennas 21 and 22 have their response directed to substantially the same portion of terrain 12. Note that this response need not be directly perpendicular to the flight path of aircraft 10 but may be disposed at a forward-looking angle or a rearward-looking angle.

Aircraft 10 also includes a ranging altimeter 23. Ranging altimeter 23 directs a radiant beam 24 downward toward nadir point 19. This radiant beam 24 has a beam width angle $\epsilon$, whose magnitude will be further discussed below. Ranging altimeter 23 detects reflection of this radiant beam from terrain 12. Ranging altimeter 23 determines the distance of aircraft 10 above terrain 12 by detecting the time for this reflection to return from nadir point 19. In accordance with the preferred embodiment of this invention ranging altimeter 23 may be a radar altimeter or a laser ranging instrument.

In operation aircraft 10 flies by the terrain to be mapped. In one embodiment antenna 21 is active and periodically transmits a radar pulse, which is typically frequency modulated, having a center wavelength $\lambda$. Both antennas 21 and 22 receive the return echoes from these transmissions. The signals received at the two antennas 21 and 22 are separately processed in slant range and Doppler frequency according to the prior art. This yields a two dimensional image of terrain 12 indicating the slant range R and the cross track coordinate corresponding to the Doppler frequency for each antenna 21 and 22. At the same time ranging altimeter 23 repeatedly detects the distance a from aircraft 10 to nadir point 19. These two dimensional complex images and the altimeter data are employed in construction of a three dimensional terrain map.

FIG. 1 illustrates the foreshortening of higher elevations in the prior art. Doppler frequency processing of the return response localizes points 13 and 14 of terrain 12 to the plane of the illustration. Thus points 13 and 14 can only be distinguished in slant range. Point 13 lies on arc 15 and has a slant range R'. Point 14 lies on arc 16 and has a slant range R. Point 14, which has a higher elevation than point 13, appears closer to the flight path of aircraft 10 than would a point at the same elevation as point 13. This is because the slant range R is less because of the elevation of point 14. Because of the ambiguities inherent in synthetic aperture radar processing, points along arc 16 cannot be distinguished. This arc ambiguity also leads to distortion in determination of the ground range d to a particular point in terrain 12.

Figure 2:
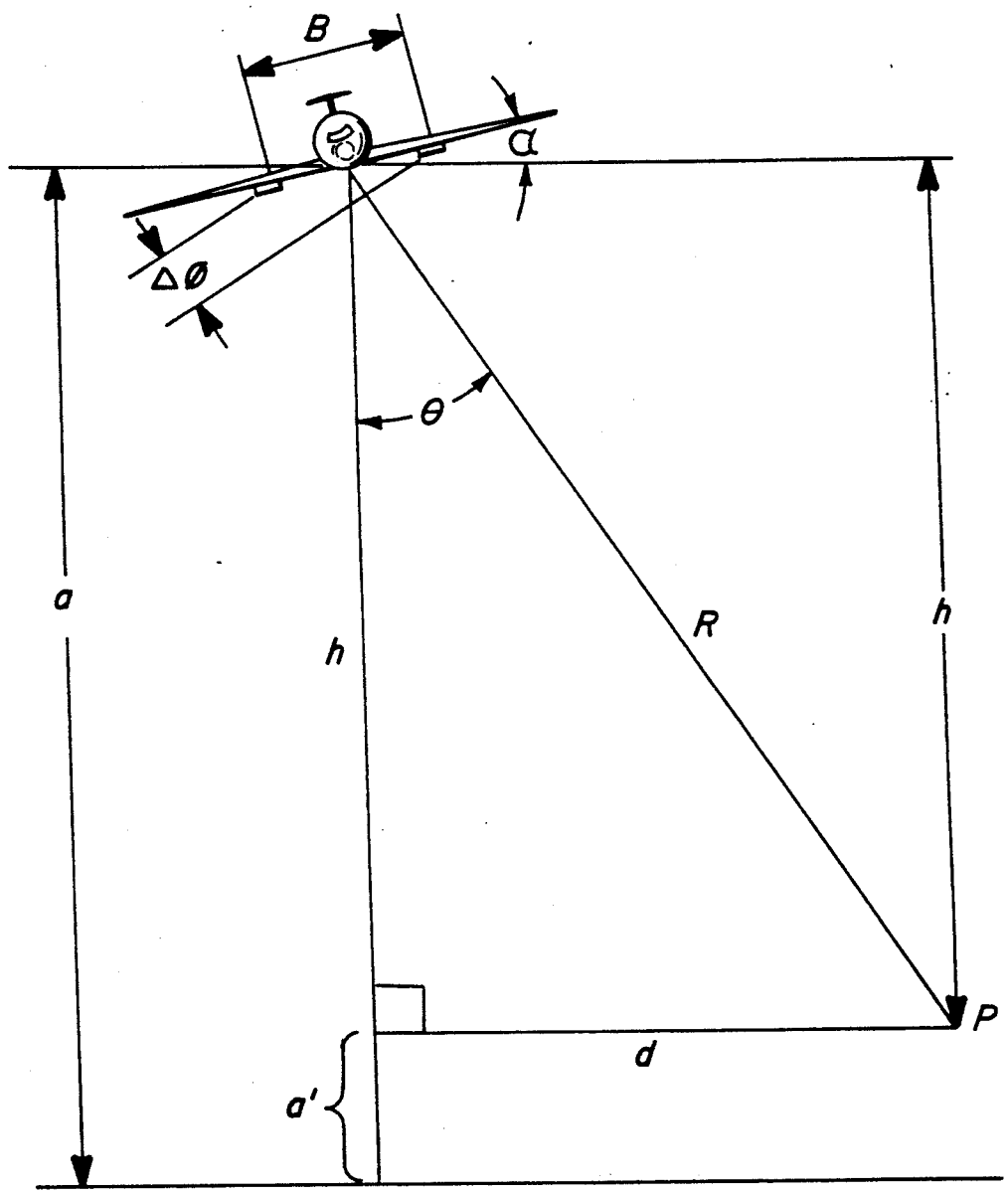
FIG. 2 illustrates the principle of correction for roll angle of the interferometer baseline.

FIG. 2 illustrates the manner of using the two antennas 21 and 22 to detect slant angle $\theta$ to a particular point P as proposed in Goldstein et al. Echo returns to the two antennas 21 and 22 are processed as a plurality of resolution cells divided by slant range R and Doppler frequency. This processing into individual resolution cells permits identification of the respective echo returns at antennas 21 and 22 from the same point P to be located in three dimensions. The difference in received phase $\Delta\phi$ between two echo returns for the same resolution cell enables determination of the slant angle $\theta$. This phase difference is given by:

$$\Delta\phi = \frac{2\pi B}{\lambda} \sin(\theta - \alpha) \qquad (1)$$

where: $\Delta\phi$ is the phase difference between the echo returns for the two antennas 21 and 22; B is the known distance between antennas 21 and 22; $\theta$ is the slant angle to point P; $\alpha$ is the roll angle of the interferometer baseline which is primarily due to roll of aircraft 10; and $\lambda$ is the average wavelength of the radar transmissions. Solving for the slant angle $\theta$ we find:

$$\theta = \alpha + \sin^{-1}\left(\frac{\Delta\phi\lambda}{2\pi B}\right) \qquad (2)$$

The difference in height h between aircraft 10 and point P is given by:

$$h' = R \cos\theta \qquad (3)$$

where: h' is the difference in height between aircraft 10 and point P; and R is the slant range to point P. The altitude a' of point P is calculated from the known or measured altitude a of aircraft 10 relative to a fixed reference such as sea level as follows:

$$a' = a - h' \qquad (4)$$

Thus the altitude a' is given by:

$$a' = a - R \cos\left\{\alpha + \sin^{-1}\left(\frac{\Delta\phi\lambda}{2\pi B}\right)\right\} \qquad (5)$$

Lastly, the ground range d from the track of aircraft 10 to point P is calculated as follows:

$$d = R \sin\theta \qquad (6)$$

This is expanded as follows:

$$d = R \sin\left\{\alpha + \sin^{-1}\left(\frac{\Delta\phi\lambda}{2\pi B}\right)\right\} \qquad (7)$$

The calculated altitude a' and ground range d of point P are employed in production of the terrain map.

There is a practical problem with the technique proposed by Goldstein et al. The determination of the slant angle $\theta$ and hence the calculated altitude a' and ground range d are dependant upon the roll angle $\alpha$. The accuracy of the terrain map depends on the accuracy of the roll angle determination. Particularly at long slant ranges, achievable accuracies in determination of the roll angle $\alpha$ result in large errors in the calculated altitude and ground range. There is thus a need for a more accurate determination of the roll angle $\alpha$.

Figure 3:
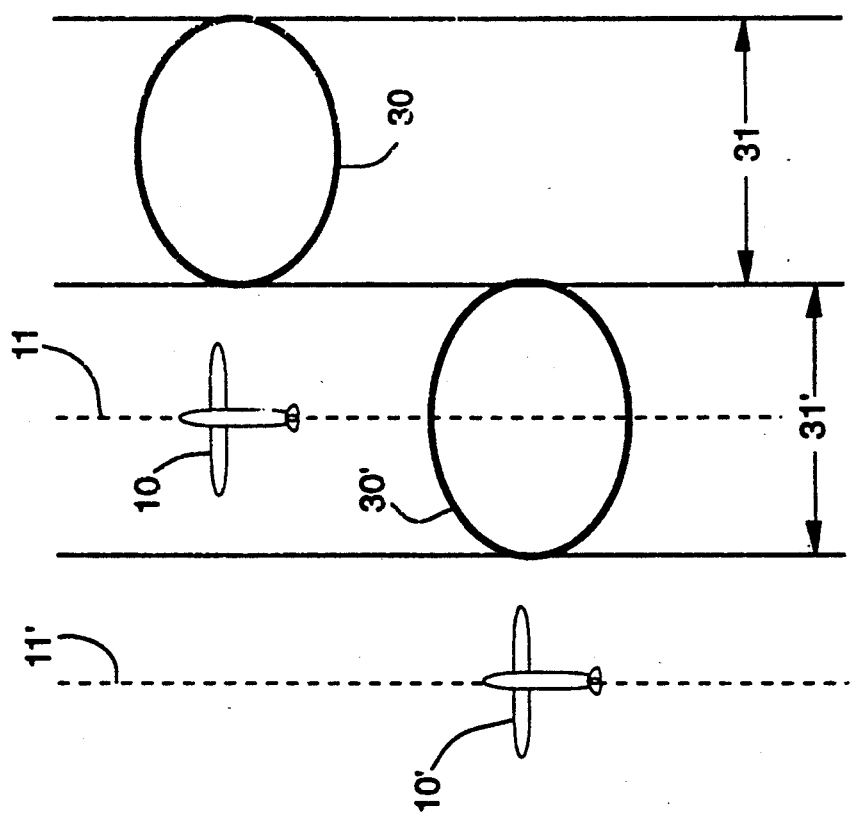
FIG. 3 illustrates the disposition of flight paths in accordance with this invention.

This invention employs ranging altimeter 23 to provide additional data for a more accurate determination of the roll angle $\alpha$. An overlapping technique, illustrated in FIG. 3, permits accurate determination of the roll angle $\alpha$. Aircraft 10 first flies on track 11. During this flight aircraft 10 operates antennas 21 and 22 to record synthetic aperture radar data. Each transmission covers an area 30 permitting reception of echo returns over this area. During the course of the flight on track 11, the areas 30 overlap to cover a strip of terrain 31. Ranging altimeter 23 provides a substantially continuous measure of the altitude h above ground of aircraft 10 along the flight path 11.

Aircraft 10 then flies on path 11'. Flight path 11' is substantially parallel to flight path 11. The distance from flight path 11 to flight path 11' is selected to provide radar data from a strip 31' that is immediately adjacent to strip 31. It is important that the radar data from strip 31 cover flight path 11 of the prior flight. Aircraft 10 employs antennas 21 and 22 to take radar data of strip 31' during this flight.

This data permits a more accurate determination of the roll angle $\alpha$. It is necessary to identify the synthetic aperture radar data for particular points taken during one flight with the altimeter data for the same points taken during the other flight. Thus the phase difference $\Delta\phi$ for a particular point P from one flight and the measured altitude h' of aircraft 10 above ground at point P from another flight are known. Assuming the altitude of aircraft 10 relative to some unchanging standard, such as sea level, is the same for the two flights, then the roll angle $\alpha$ can be computed. From equation (3) we have:

$$\theta = \cos^{-1}\left(\frac{h'}{R}\right) \qquad (8)$$

where R is the known slant range to point P. If the altitudes of the two flights differ, then the measured altitude h' is corrected for this difference in altitude. Suppose the height during the flight taking the altitude measurements is greater than the height during the flight taking the synthetic aperture radar data by $\Delta h$. Then equation (8) is corrected as:

$$\theta = \cos^{-1}\left(\frac{h' - \Delta h}{R}\right) \qquad (9)$$

Substituting the computed value of $\theta$ into equation (2), in the case for equal height flights, and solving for $\alpha$ yields:

$$\alpha = \cos^{-1}\left(\frac{h'}{R}\right) - \sin^{-1}\left(\frac{\Delta\phi\lambda}{2\pi B}\right) \qquad (10)$$

Thus $\alpha$ can be determined from known quantities ($\lambda$ and B) and measured quantities (h', R and $\Delta\phi$). This computed value of $\alpha$ can then be used in the manner taught in Goldstein et al to produce an accurate terrain map for other points in the cross track swath including point P.

There are several factors to consider in forming the terrain map. It should be understood that it is immaterial whether aircraft 10 first flies along path 11 and makes the altimeter measurement and then flies along path 11' and makes the synthetic aperture radar measurements or makes these measures in the opposite order. In either event all that is necessary is the correlation of altimeter data and synthetic aperture radar data regarding the same point on the ground. Correlation of these two measures need not take place for every possible ground point on each flight path 11. Suitably accurate terrain maps can be formed so long as this correlation and computation of the roll angle α takes place at intervals that are short in relation to the quotient of the time rate of change of the roll angle α divided by the speed of aircraft 10. After correlating the data regarding a first point P and computing the roll angle α, the synthetic radar data is corrected for ground height using the computed value of roll angle α for the swath of cross track resolution cells including the point P. This process is repeated for additional points P along the flight path 11. Interpolations of the computed roll angle α are used for points between the swaths of the successive points P. It should be understood that this computation can include corrections for differences in the altitude of aircraft 10 above a fixed reference between the two flights. Note that the altimeter measurement h may be averaged over an area small in relation to the periodicity of terrain elevation changes in order to smooth out noise in this measurement. This implies a time average over a time small relative to the product of the rate of change of altitude with distance and the speed of aircraft 10. Lastly, the beam width angle ε of the altimeter beam 24 must be great enough to insure illumination of nadir point 19 for all expected roll angles α.

Figure 4:
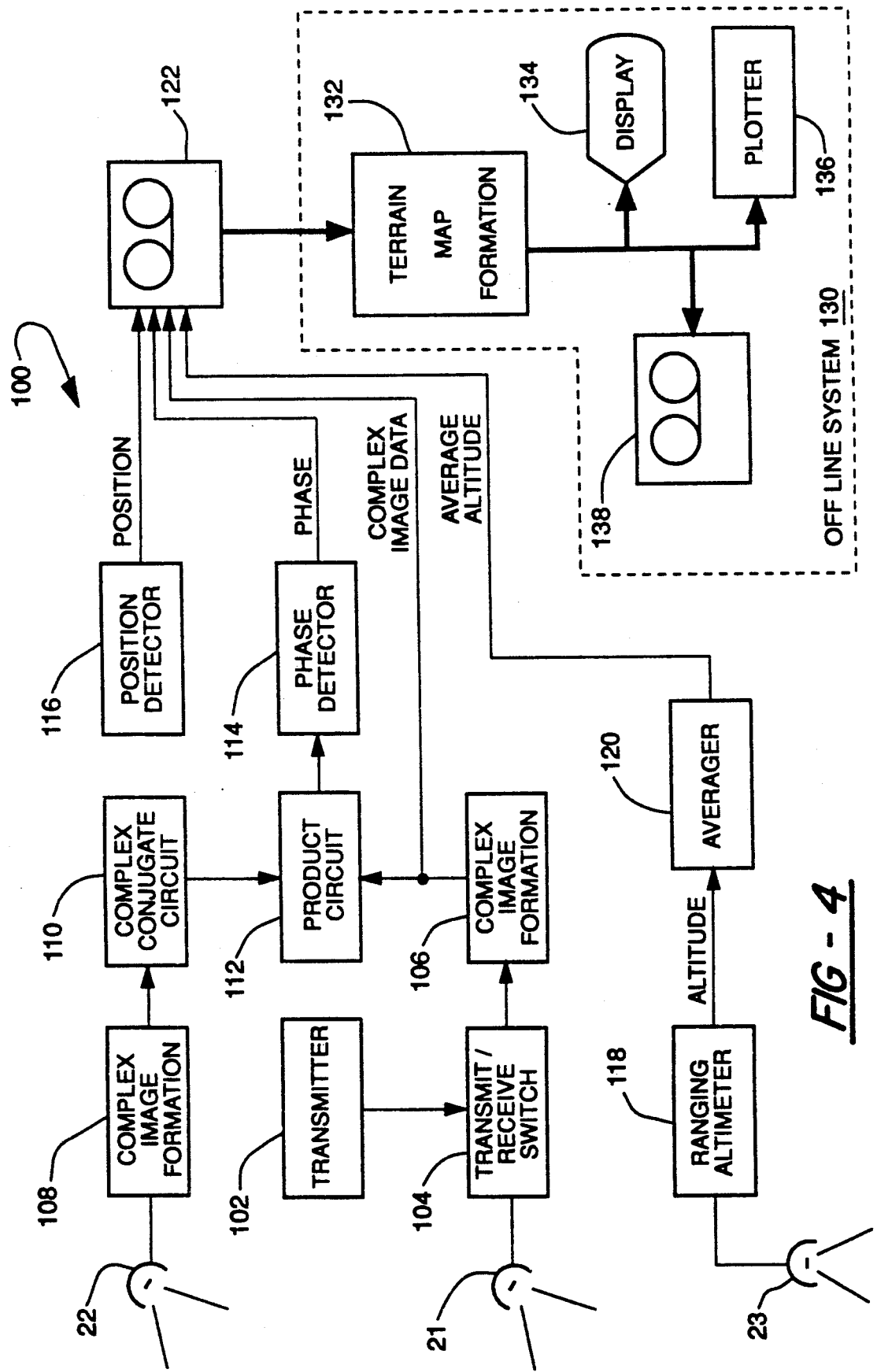
FIG. 4 illustrates in block diagram form an apparatus for practicing this invention.

FIG. 4 illustrates in block diagram form apparatus 100 for practicing this invention. Apparatus 100 includes transmitter 102. Transmitter 102 periodically generates a radar transmission that is coupled to antenna 21 via transmit/receive switch 104. Apparatus 100 includes two synthetic aperture receivers. Complex image formation receiver 106 produces synthetic aperture complex image data for plural resolution cells in slant range and Doppler frequency for echo returns received by antenna 21 through transmit/receive switch 104. Complex image formation receiver 108 produces similar synthetic aperture complex image data for plural resolution cells in slant range and Doppler frequency for echo returns received by antenna 22.

The phase difference between the synthetic aperture complex image data for corresponding resolutions cells of the echo returns to antennas 21 and 22 is detected using complex conjugates. If $A\, e^{j\theta}$ is the complex radar amplitude cross section from a particular point P, then:

$$s_a = A\, e^{j\theta}\, e^{j\Delta\phi} \quad (11)$$

$$s_b = A\, e^{j\theta} \quad (12)$$

where: $s_a$ is the echo return signal at antenna 21; $s_b$ is the echo return signal at antenna 22. The phase difference $\Delta\phi$ for each resolution cell is computed from the product S of corresponding resolution cells of the synthetic aperture complex image data for the echo return signal at antenna 21 and the complex conjugate of the synthetic aperture complex image data for the echo return signal at antenna 22. This is given by:

$$\begin{aligned}
S &= s_a \times s_b \quad (13)\\
&= A\, e^{j\theta}\, e^{j\Delta\phi} \times A\, e^{-j\theta}\\
&= A^2\, e^{j\Delta\phi}
\end{aligned}$$

Detecting the phase of the signal S or of the signal S/A, which has the same phase, determines the phase difference $\Delta\phi$.

Computation of the phase difference $\Delta\phi$ is performed by complex conjugate circuit 110, product circuit 112, and phase detector 114. Complex conjugate circuit 110 computes the complex conjugate of the synthetic aperture complex image data for each resolution cell of the echo returns received by antenna 22. Product circuit 112 forms the product of corresponding resolution cells of the synthetic aperture complex image received from antenna 21 with the conjugate of the synthetic aperture complex image data corresponding to the echo returns received from antenna 22. Phase detector 114 detects the phase of this product signal for each resolution cell. The resulting signal corresponds to the phase difference between the echo return of antennas 21 and 22.

The various data streams are supplied to multichannel recorder 122. Multichannel recorder 122 is capable of recording in time synchronism several channels of data. Multichannel recorder 122 receives the synthetic aperture complex image data for each resolution cell corresponding to the uncorrected terrain image generated from echo returns received by antenna 21, the phase difference data from phase detector 114 for each resolution cell, position data from position detector 116 and average altitude data from averager 120. Position detector 116 is preferably the well known Global Positioning System (GPS) that uses satellite transmissions for position detection. Position detector 116 may also include a ground based radio positioning system and/or an inertial guidance system. Naturally the accuracy of the terrain map formed by this system corresponds to the accuracy of determination of the position of aircraft 10 during the data gathering. The altitude data from ranging altimeter 118 is averaged in averager 120. Averager 120 forms a time average over a time that is small compared to the product of the rate of change of altitude with distance along the flight path 11 and the speed of aircraft 10. These data streams are preferably recorded as they are generated and permanently stored on magnetic tape at multichannel recorder 122.

Terrain map formation occurs in off line system 130. The data streams recorded by multichannel recorder 122 are supplied to off line system 130, which produces the desired terrain map. This data supply may be made by connection of multichannel recorder 122 to off line system 130 or by transfer of tapes recorded by multichannel recorder 122 to a compatible recorder connected to off line system 130. Off line system 130 is preferably a ground system not mounted on aircraft 10. Separate recording of the data streams via multichannel recorder 122 and analysis via off line system 130 reduces the amount of computing equipment required aboard aircraft 10. This permits the use of a smaller aircraft to achieve the same terrain mapping task. In addition off line system 130 need not be constructed to the more stringent standards required for airborne systems.

Off line system 130 preferably includes a general purpose computer programmed to produce the terrain maps. This process takes place as follows. First, the complex image data and the phase difference data taken simultaneously are employed together with the aircraft position data to produce a terrain map uncorrected for roll angle α. The data taken simultaneously can be identified because it appears on corresponding points within the multichannel tape produced by multichannel recorder 122. Next, particular points where altitude data was taken on one flight are identified with the same points in the synthetic aperture radar data. The roll angle α is computed according to equation (8). This computed roll angle α permits correction of the terrain image for roll angle using equations (5) and (7) for a swath of cross track resolution cells including the particular point. For resolution cells between these swaths of cross track resolution cells, an interpolation of the roll angle $\alpha$ may be used in the terrain image correction. This process of correction for roll angle $\alpha$ is repeated throughout each strip 31 of the synthetic aperture radar data. The resulting terrain map may be translated into a contour map by interpolating from the measured elevations. This contour may be displayed via display 134, plotted via plotter 136 or stored via recorder 138.

The accuracy of the terrain map may be improved by correlating the synthetic aperture radar data with ground survey data. A three dimensional ground survey is made of a few points of terrain easy to identify in the synthetic aperture radar terrain map. These easy to identify points any be any sharp terrain features such as a land/water boundary. A radar corner reflector can be used to ensure a location in the synthetic aperture radar terrain map is easy to identify. The synthetic aperture radar terrain map is then conformed to the ground survey at these few points.

It is technically feasible to perform the same computations for production of the corrected terrain map while aloft. All that is required is a computer of sufficient speed and computational capacity to be able to make the terrain map corrections detailed above during flight. Note it is still necessary for some data storage as provided by tape recorder 122. The complex image data and the altitude data corresponding to the same terrain, which must be used in determining the roll angle of the interferometer baseline, are received during different flights of aircraft 10. This requires that data for at least one of these measurements must be stored between flights.

Figure 5:
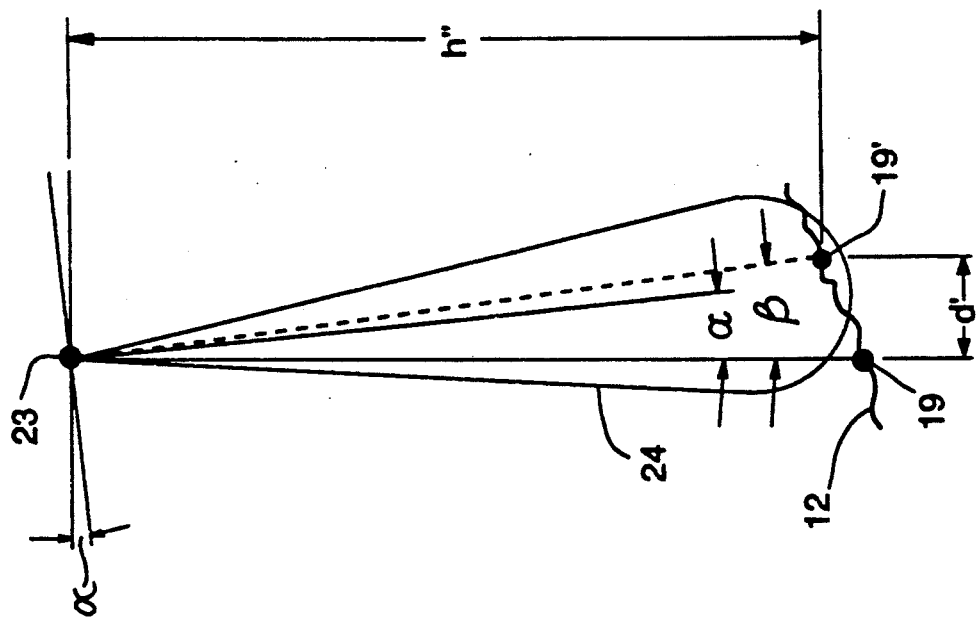
FIG. 5 illustrates the geometry of a second order terrain map correction according to this invention.

FIG. 5 illustrates the geometry for making a second order correction to the terrain map. Depending on the terrain, the first return point for ranging altimeter 23 need not be the nadir point 19. In general the first return point for ranging altimeter 23 coincides with nadir point 19 only if terrain 12 is perfectly flat or if nadir point 19 is a local maximum in elevation. FIG. 5 shows terrain 12 sloping upward to the right. In this case the first return point 19' differs from the nadir point 19 because it is nearer to ranging altimeter 23. As a result the measured altitude h', which is actually the slant range from ranging altimeter 23 to first return point 19', differs from the true height h". This difference creates errors in computed roll angle $\alpha$ and in the corrected elevation and ground range leading to an inaccurate terrain map.

These errors can be corrected to some extent with additional computation. First, a first order corrected terrain map is formed in the manner described above. The terrain map includes an indication of the elevation of terrain 12 in the vicinity of the track 11 of aircraft 10. The aircraft position data from that flight indicates the position of aircraft 10 for each computation of the roll angle $\alpha$. This data permits determination of position of point 19', which produces the first return in altimeter 23. Note that this search for first return point 19' should be limited to points within the main lobe of the response of ranging altimeter 23. This should take into account the first order estimate of roll angle $\alpha$. As shown in FIG. 5 first return point 19' does not necessary fall exactly on the bore sight of beam 24 even when roll angle $\alpha$ is taken into account. Note that first return point 19' may be in front of, behind or on either side of the track of aircraft 10 depending on the contour of terrain 12.

Once point 19' is determined then the corrected height h" is computed. This may be computed directly from the first order corrected terrain map and position data or may be computed as:

$$h'' = h' \cos \beta \qquad (14)$$

where: $\beta$ is the angle from vertical to first return point 19' as shown in FIG. 5. Note that equation (14) makes clear that h"=h' when $\beta$=0, or first return point 19' coincides with nadir point 19.

The remainder of the second order correction takes place in the same manner as the first order correction. The second order corrected roll angle $\alpha'$ is computed according to equation (10) employing the newly determined height h" in place of height h' as follows:

$$\alpha' = \cos^{-1}\left(\frac{h''}{R}\right) - \sin^{-1}\left(\frac{\Delta\phi\lambda}{2\pi B}\right) \qquad (15)$$

This second order corrected roll angle $\alpha'$ permits correction of the terrain image in elevation according to equation (5) as follows:

$$a'' = a - R \cos\left\{\alpha' + \sin^{-1}\left(\frac{\Delta\phi\lambda}{2\pi B}\right)\right\} \qquad (16)$$

where a" is the second order corrected elevation. Lastly, the second order corrected ground range d' is computed and according to equation (7) as follows:

$$d' = R \sin\left\{\alpha' + \sin^{-1}\left(\frac{\Delta\phi\lambda}{2\pi B}\right)\right\} \qquad (17)$$

Note the fact that first return point 19' will wander ahead, behind or beside the flight track means that the reference points of these equations should be shifted accordingly. As shown in FIG. 5, first return point 19' is displaced to the right of nadir point 19 a distance of d'.

A further refinement is possible in the case in which roll angle $\alpha$ is not continuously computed but computed only at discrete intervals. As taught above, roll angle $\alpha$ need only be computed at intervals which are short in relation to the quotient of the time rate of change of the roll angle $\alpha$ divided by the speed of aircraft 10. If this technique is used with the second order corrections, then an entire terrain map with first order corrections need not be computed. It will suffice to produce a terrain map with first order corrections for only those regions near the points of computation of roll angle $\alpha$. These regions would include only those areas which may fall within the beam width of the ranging altimeter 23. This permits determination of the first return point 19' at each of these points enabling the second order correction.

Figure 6:
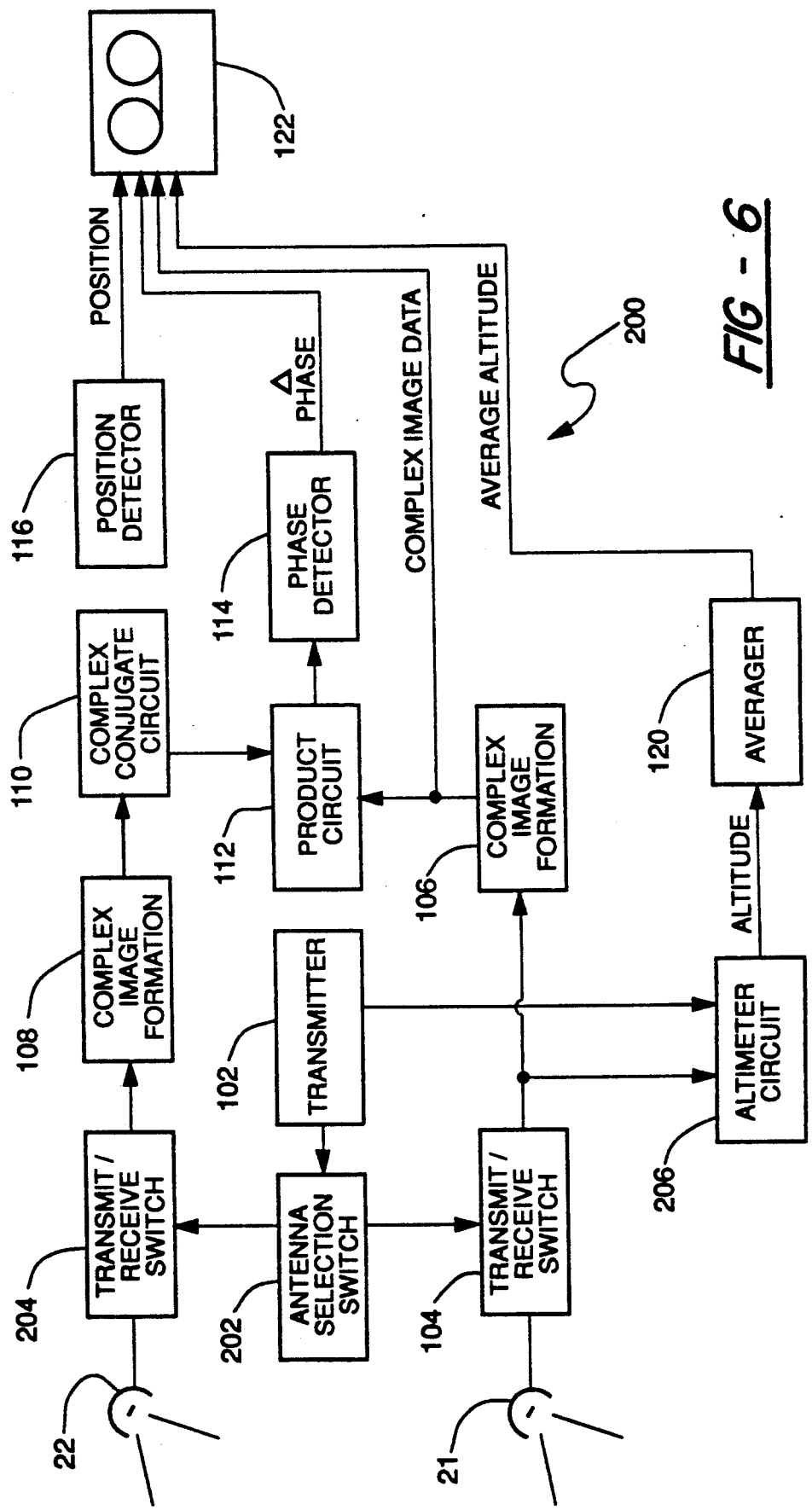
FIG. 6 illustrates in block diagram form an alternative apparatus for practicing this invention.

FIG. 6 illustrates a block diagram of an alternative apparatus 200. For simplicity only the portion of the apparatus mounted on the aircraft is shown in FIG. 6. The off line system used with this alternative apparatus is the same as shown in FIG. 4.

Alternative apparatus 200 differs from apparatus 100 in the radar transmissions. Apparatus 200 provides a manner for transmission via both antennas 21 and 22. Transmitter 102 is coupled to antenna selection switch 202. Antenna selection switch 202 supplies the radar transmission from transmitter 102 either to transmit/receive switch 104 or to transmit/receive switch 204. It is preferable to alternate transmission from antenna 21 and 22 by alternating coupling transmitter to transmit/receive switches 104 and 204. The complex image formation receiver 106 and 108 may also be employed alternately. Thus a radar pulse is transmitted by antenna 21 and the echo return received on antenna 21, and next a radar pulse is transmitted by antenna 22 and the echo return received on antenna 22. This technique has the advantage of enhancing the resolution of the measurement. The phase difference $\Delta\phi$ between the echo returns for the two antennas 21 and 22 is given by:

$$\Delta\phi = \frac{4\pi B}{\lambda} \sin(\theta - \alpha) \quad (18)$$

where the quantities are as defined above in conjunction with equation (1). The factor of 2 between the relationships of equation (1) and equation (14) is due to the doubled signal path in the two transmitter case. In the single transmitter case the only path length difference which can contribute to the phase difference $\Delta\phi$ occurs during the echo return. In the two transmitter case path length differences occur in both the transmission path and in the echo return path. Note that equations (2), (5), (7) and (10) must be modified to include this factor of 2 if transmission are made from both antennas. Thus the interferometer baseline roll angle $\alpha$ is given by:

$$\alpha = \cos^{-1}\left(\frac{h'}{R}\right) - \sin^{-1}\left(\frac{\Delta\phi\lambda}{4\pi B}\right) \quad (19)$$

The corrected elevation $a'$ is given by:

$$a' = a - R\cos\left\{\alpha + \sin^{-1}\left(\frac{\Delta\phi\lambda}{4\pi B}\right)\right\} \quad (20)$$

Lastly, the ground range d is calculated as follows:

$$d = R\sin\left\{\alpha + \sin^{-1}\left(\frac{\Delta\phi\lambda}{4\pi B}\right)\right\} \quad (21)$$

This enhanced resolution permits production of better terrain maps from the same basic equipment or production of equal quality terrain maps form, less sophisticated equipment.

It is feasible to employ the echo returns from both antennas 21 and 22 for each transmission regardless of the source antenna. The receiver noise from the two antennas is independent. Thus this additional data, though of a lesser resolution, can be used to reduce the signal to noise ratio in the complex image formation.

The previously described apparatus 100 contemplated a separate ranging altimeter. The required altitude measurement could be made using the synthetic aperture radar transmitter and receiver. The ground immediately below aircraft 10 is much closer to the antennas 21 and 22 than the points within the main response of these antennas. Thus the echo return from the ground immediately below aircraft 10 may be of greater signal strength than the desired echo return, even though the first ground return is from a side lobe of the transmission and is received on a side lobe of the antenna. Typically the receiver in a downwardly looking synthetic aperture radar must be gated off for an interval following each transmission. This prevents the nearby ground return from overloading the receiver. If the receiver gain is reduced then this first ground return can serve as the altimeter echo return.

FIG. 5 illustrates altimeter circuit 206. Altimeter circuit 206 receives a signal from transmitter 102 indicating the time of transmission. Altimeter circuit 206 also receives the received echo return signal from transmit/receive switch 104. Altimeter circuit 206 employs these signals to generate an altitude signal in the same manner as previously described in conjunction with ranging altimeter 118. Although altimeter circuit 206 is illustrated as separate from complex image formation receiver 106, those skilled in the art would realize that these circuits could employ common parts. The essential feature of this alternative embodiment is that the altimeter signal is determined from the primary synthetic aperture radar transmissions without requiring a separate ranging altimeter.

I claim:

1. A method of terrain mapping employing a platform including first and second antennas, the first and second antennas each having a predetermined field of view and together forming an interferometer baseline, said method comprising the steps of:

moving the platform substantially perpendicular to the interferometer baseline along a set of substantially parallel platform paths;

for each such platform path;

repeatedly detecting the position of the moving platform, repeatedly detecting the distance above the terrain of the moving platform via a radiant ranging sensor, repeatedly transmitting a radar signal via at least one of the first and second antennas, receiving reflections of each of said transmitted radar signals via the predetermined field of view of at least one of the first and second antennas, forming first synthetic aperture complex image data for a plurality of resolution cells in slant range and Doppler frequency from radar reflections received by the first antenna employing plural transmitted radiant signals;

forming second synthetic aperture complex image data for a plurality of resolution cells in slant range and Doppler frequency from radar reflections received by the second antenna employing plural transmitted radiant signals;

determining the phase difference between said first and second synthetic aperture complex image data for each resolution cell;

computing the elevation and ground range for each resolution cell within a selected one of said first and second synthetic aperture complex image data for each of said set of platform paths employing the detected position of the moving platform and the phase difference between said first and second synthetic aperture complex image data for that platform path;

computing a first order corrected elevation and ground range for each resolution cell for each of said set of platform paths corrected for interferometer baseline roll angle employing said detected distance above the terrain of the moving platform of a corresponding adjacent platform path where the moving platform passed above the terrain imaged in said selected one of said first and second synthetic aperture complex image data; and computing a second order corrected elevation and ground range for each resolution cell corrected for the first return point of said radiant ranging sensor, employing said first order corrected elevation and ground range for resolution cells near each of said corresponding adjacent platform paths.

2. The method of terrain mapping as claimed in claim 1, wherein:

said step of moving the platform along said set of platform paths occurs at a substantially constant altitude.

3. The method of terrain mapping as claimed in claim 1, wherein:

said step of computing said corrected elevation and ground range for each resolution cell includes correction for any difference in altitude between each platform path and said corresponding adjacent platform path.

4. The method of terrain mapping as claimed in claim 1, wherein:

said step of computing said first order corrected elevation and ground range for each resolution cell includes time averaging said detected distance above the terrain of the moving platform over a time small in relation to the product of the rate of change of terrain altitude with distance along said platform path and the speed of the moving platform.

5. The method of terrain mapping as claimed in claim 1, further comprising:

recording said repeatedly detected position of the moving platform, said repeatedly detected distance above the terrain of the moving platform, said phase difference between said first and second aperture complex image data for each resolution cell and at least one of said first and second synthetic aperture complex image data for each resolution cell on a multichannel recorder; and said steps of computing the elevation and ground range for each resolution cell within said selected one of said first and second synthetic aperture complex image data and computing said corrected elevation and ground range for each resolution cell occur remotely from the moving platform using said recording.

6. The method of terrain mapping as claimed in claim 1, wherein:

said step of determining the phase difference between said first and second synthetic aperture complex image data for each resolution cell includes forming the complex conjugate of one of said first and second synthetic aperture complex image data of each resolution cell, multiplying said complex conjugate of said one of said first and second synthetic aperture complex image data of each resolution cell by the other of said first and second synthetic aperture complex image data of the corresponding resolution cell, thereby forming a product signal for each resolution cell, determining the phase angle of said product signal of each resolution cell.

7. The method of terrain mapping as claimed in claim 1, wherein:

said step of repeatedly detecting the distance above the terrain of the moving platform via a radiant ranging sensor includes transmitting a beam of radiation having a predetermined beam width toward the ground, receiving radiation reflected from the ground, and detecting the distance above the terrain of the moving platform from the time required to receive said transmitted radiation reflected from the ground; and said step of computing a second order corrected elevation and ground range for each point of terrain includes computing a first order corrected interferometer baseline roll angle for each point of said corresponding adjacent platform path, determining the illuminated terrain within said predetermined beam width of said radiant beam for each point of said corresponding adjacent platform path taking into account said first order corrected interferometer baseline roll angle, determining the first return point of said illuminated terrain closest to the moving platform for each point of said corresponding adjacent platform path, determining the elevation of said first return point of said illuminated terrain closest to the moving platform for each point of said corresponding adjacent platform path, computing a second order corrected interferometer baseline roll angle for each point of said corresponding adjacent platform path employing said elevation of a corresponding first return point, and computing said second order corrected elevation and ground range for each resolution cell employing said second order corrected interferometer baseline roll angle.

8. The method of terrain mapping as claimed in claim 1, wherein:

said step of computing said first order corrected elevation and ground range for each resolution cell includes computing the interferometer baseline roll angle at discrete intervals which are short in relation to the quotient of the time rate of change of the interferometer baseline roll angle divided by the speed of the moving platform, computing said first order corrected elevation for each resolution cell using the corresponding computed interferometer baseline roll angle, computing said first order corrected ground range for each resolution cell using the corresponding computed interferometer baseline roll angle; and said step of computing said second order corrected elevation and ground range for each resolution cell includes determining the illuminated terrain within said predetermined beam width of said radiant beam for each of said discrete points of first order corrected interferometer baseline roll angle computation taking into account said first order corrected interferometer baseline roll angle, said region surrounding each of said discrete points of first order corrected interferometer baseline roll angle computation selected to include said illuminated terrain, determining the first return point of said illuminated terrain closest to the moving platform for each of said discrete points of first order corrected interferometer baseline roll angle computation, determining the elevation of said first return point of said illuminated terrain closest to the moving platform for each of said discrete points of first order corrected interferometer baseline roll angle computation, computing a second order corrected interferometer baseline roll angle for discrete points corresponding to said discrete points of first order corrected interferometer baseline roll angle computation employing said elevation of a corresponding first return point, computing a second order corrected elevation for each point of terrain employing a corresponding second order corrected interferometer baseline roll angle, and computing a second order corrected ground range for each point of terrain employing a corresponding second order corrected interferometer baseline roll angle.

9. The method of terrain mapping as claimed in claim 1, wherein:

said step of computing said first order corrected elevation and ground range for each resolution cell includes computing the first order corrected interferometer baseline roll angle at discrete intervals, computing said first order corrected elevation for each resolution cell using the corresponding computed first order corrected interferometer baseline roll angle for resolution cells at said discrete intervals, computing said first order corrected ground range for each resolution cell using the corresponding computed first order corrected interferometer baseline roll angle for resolution cells at said discrete intervals; and said step of computing said second order corrected elevation and ground range for each resolution cell includes determining the illuminated terrain within said predetermined beam width of said radiant beam for each of said discrete points of first order corrected interferometer baseline roll angle computation taking into account said first order corrected interferometer baseline roll angle, said region surrounding each of said discrete points of first order corrected interferometer baseline roll angle computation selected to include said illuminated terrain, determining the first return point of said illuminated terrain closest to the moving platform for each of said discrete points of first order corrected interferometer baseline roll angle computation, determining the elevation of said first return point of said illuminated terrain closest to the moving platform for each of said discrete points of first order corrected interferometer baseline roll angle computation, computing the second order corrected interferometer baseline roll angle at said discrete intervals, computing said second order corrected elevation for each resolution cell using the corresponding computed second order corrected interferometer baseline roll angle for resolution cells at said discrete intervals, computing said second order corrected elevation for each resolution cell using an interpolation of said computed second order corrected interferometer baseline roll angle at discrete intervals for resolution cells between said discrete intervals, computing said second order corrected ground range for each resolution cell using the corresponding computed second order corrected interferometer baseline roll angle for resolution cells at said discrete intervals, and computing said second order corrected ground range for each resolution cell using an interpolation of said computed second order interferometer baseline roll angle at discrete intervals for resolution cells between said discrete intervals.

10. The method of terrain mapping as claimed in claim 1, wherein:

said step of repeatedly detecting the distance above the terrain of the moving platform via a radiant ranging sensor employs detection of the first echo return of a transmitted a radar signal off the predetermined field of view of at least one of the first and second antennas.

11. The method of terrain mapping as claimed in claim 1, further comprising the steps of:

performing a three dimensional ground survey for a plurality of survey points within the terrain imaged;

identifying said resolution cells corresponding to each of said plurality of survey points; and conforming said second order corrected elevation and ground range for each resolution cell whereby said second order corrected elevation and ground range for each resolution cell identified as corresponding to one of said plurality of survey points corresponds to said three dimensional survey of that survey point.

12. The method of terrain mapping as claimed in claim 11, wherein:

said step of identifying said resolution cells corresponding to each of said plurality of survey points includes disposing a radar corner reflector at each of said plurality of survey points.

13. The method of terrain mapping as claimed in claim 1, wherein:

said step of repeatedly transmitting a radar signal via at least one of the first and second antennas consists of repeatedly transmitting a radar signal via the first antenna;

said step of receiving reflections of each of said transmitted radar signals via the predetermined field of view of at least one of the first and second antennas consists of receiving reflections of each of said transmitted radar signals via both the first and second antennas.

14. The method of terrain mapping as claimed in claim 13, wherein:

said step of computing said first order corrected elevation and ground range for each resolution cell includes computing a first order corrected interferometer baseline roll angle according to $$\alpha = \cos^{-1}\left(\frac{h'}{R}\right) - \sin^{-1}\left(\frac{\Delta\phi\lambda}{2\pi B}\right)$$

where $\alpha$ is the first order corrected interferometer baseline roll angle to be computed, R is the slant range to a particular point during said platform path, h' is the measured altitude of the moving platform above the particular point during said corresponding adjacent platform path, $\Delta\phi$ is the phase difference measured between said first and second synthetic aperture complex images of the particular point during said platform path, $\lambda$ is the average wavelength of said transmitted radar signal, and B is the distance between the first and second antennas, computing said first order corrected elevation as $$a' = a - R\cos\left\{\alpha + \sin^{-1}\left(\frac{\Delta\phi\lambda}{2\pi B}\right)\right\}$$

where a' is said first order corrected elevation to be computed and a is the elevation of the moving platform when following said corresponding adjacent platform path above said particular point, and computing said first order corrected ground range as $$d = R\sin\left\{\alpha + \sin^{-1}\left(\frac{\Delta\phi\lambda}{2\pi B}\right)\right\}$$

where d is said first order corrected ground range to be computed;

said step of computing said second order corrected elevation and ground range for each resolution cell includes determining the illuminated terrain within said predetermined beam width of said radiant beam for each point of said corresponding adjacent platform path taking into account said first order corrected interferometer baseline roll angle, determining the first return point of said illuminated terrain closest to the moving platform for each point of said corresponding adjacent platform path, determining the elevation of said first return point of said illuminated terrain closest to the moving platform for each point of said corresponding adjacent platform path, computing a second order corrected interferometer baseline roll angle according to $$\alpha' = \cos^{-1}\left(\frac{h''}{R}\right) - \sin^{-1}\left(\frac{\Delta\phi\lambda}{2\pi B}\right)$$

where $\alpha'$ is the second order corrected interferometer baseline roll angle to be computed, R is the slant range to said first return point during said platform path, h'' is the measured altitude of the moving platform above said first return point during said corresponding adjacent platform path, $\Delta\phi$ is the phase difference measured between said first and second synthetic aperture complex images of said first return point during said platform path, $\lambda$ is the average wavelength of said transmitted radar signal, and B is the distance between the first and second antennas, computing said second order corrected elevation as $$a'' = a - R\cos\left\{\alpha' + \sin^{-1}\left(\frac{\Delta\phi\lambda}{2\pi B}\right)\right\}$$

where a'' is said second order corrected elevation to be computed and a is the elevation of the moving platform when following said corresponding adjacent platform path above said first return point, and computing said second order corrected ground range as $$d' = R\sin\left\{\alpha' + \sin^{-1}\left(\frac{\Delta\phi\lambda}{2\pi B}\right)\right\}$$

where d' is said second order corrected ground range to be computed.

15. The method of terrain mapping as claimed in claim 1, wherein:

said step of repeatedly transmitting a radar signal via at least one of the first and second antennas consists of alternately transmitting a radar signal via the first antenna and then via the second antenna;

said step of receiving reflections of each of said transmitted radar signals via the predetermined field of view of at least one of the first and second antennas consists of receiving reflections of each of said transmitted radar signals via the transmitting antenna.

16. The method of terrain mapping as claimed in claim 15, wherein:

said step of computing said first order corrected elevation and ground range for each resolution cell includes computing a first order corrected interferometer baseline roll angle according to $$\alpha = \cos^{-1}\left(\frac{h'}{R}\right) - \sin^{-1}\left(\frac{\Delta\phi\lambda}{4\pi B}\right)$$

where $\alpha$ is the first order corrected interferometer baseline roll angle to be computed, R is the slant range to a particular point during said platform path, h' is the measured altitude of the moving platform above the particular point during said corresponding adjacent platform path, $\Delta\phi$ is the phase difference measured between said first and second synthetic aperture complex images of the particular point during said platform path, $\lambda$ is the average wavelength of said transmitted radar signal, and B is the distance between said first and second antennas, computing said first order corrected elevation as $$a' = a - R\cos\left\{\alpha + \sin^{-1}\left(\frac{\Delta\phi\lambda}{4\pi B}\right)\right\}$$

where a' is said first order corrected elevation to be computed and a is the elevation of the moving platform when following said corresponding adjacent platform path above said particular point, and computing said first order corrected ground range as $$d = R \sin\left\{ a + \sin^{-1}\left(\frac{\Delta\phi\lambda}{4\pi B}\right) \right\}$$

where d is said first order corrected ground range to be computed;

said step of computing said second order corrected elevation and ground range for each resolution cell includes determining the illuminated terrain within said predetermined beam width of said radiant beam for each point of said corresponding adjacent platform path taking into account said first order corrected interferometer baseline roll angle, determining the first return point of said illuminated terrain closest to the moving platform for each point of said corresponding adjacent platform path, determining the elevation of said first return point of said illuminated terrain closest to the moving platform for each point of said corresponding adjacent platform path, computing a second order corrected interferometer baseline roll angle according to $$\alpha' = \cos^{-1}\left(\frac{h''}{R}\right) - \sin^{-1}\left(\frac{\Delta\phi\lambda}{4\pi B}\right)$$

where $\alpha'$ is the second order corrected interferometer baseline roll angle to be computed, R is the slant range to said first return point during said platform path, h" is the measured altitude of the moving platform above said first return point during said corresponding adjacent platform path, $\Delta\phi$ is the phase difference measured between said first and second synthetic aperture complex images of said first return point during said platform path, $\lambda$ is the average wavelength of said transmitted radar signal, and B is the distance between the first and second antennas, computing said second order corrected elevation as $$a'' = a - R \cos\left\{ \alpha' + \sin^{-1}\left(\frac{\Delta\phi\lambda}{4\pi B}\right) \right\}$$

where a" is said second order corrected elevation to be computed and a is the elevation of the moving platform when following said corresponding adjacent platform path above said first return point, and computing said second order corrected ground range as $$d' = R \sin\left\{ \alpha' + \sin^{-1}\left(\frac{\Delta\phi\lambda}{4\pi B}\right) \right\}$$

where d' is said second order corrected ground range to be computed.

17. The method of terrain mapping as claimed in claim 1, wherein:

said step of repeatedly transmitting a radar signal via at least one of the first and second antennas consists of alternately transmitting a radar signal via the first antenna and then via the second antenna;

said step of receiving reflections of each of said transmitted radar signals via the predetermined field of view of at least one of the first and second antennas consists of receiving reflections of each of said transmitted radar signals via both the first and second antennas.

18. A method of terrain mapping employing a platform including first and second antennas, the first and second antennas each having a predetermined field of view and together forming an interferometer baseline, said method comprising the steps of:

moving the platform substantially perpendicular to the interferometer baseline along a set of substantially parallel platform paths;

for each such platform path;

repeatedly detecting the position of the moving platform, repeatedly detecting the distance above the terrain of the moving platform via a radiant ranging sensor having a predetermined beam width, repeatedly transmitting a radar signal via at least one of the first and second antennas, receiving reflections of each of said transmitted radar signals via the predetermined field of view of at least one of the first and second antennas, forming first synthetic aperture complex image data for a plurality of resolution cells in slant range and Doppler frequency from radar reflections received by the first antenna employing plural transmitted radar signals;

forming second synthetic aperture complex image data for a plurality of resolution cells in slant range and Doppler frequency from radar reflections received by the second antenna employing plural transmitted radar signals;

determining the phase difference between said first and second synthetic aperture complex image data for each resolution cell;

computing the elevation and ground range for each resolution cell within a selected one of said first and second synthetic aperture complex image data for each of said set of platform paths employing the detected position of the moving platform and the phase difference between said first and second synthetic aperture complex image data for that platform path;

computing a first order corrected elevation and ground range for discrete regions of terrain for each of said set of platform paths corrected for interferometer baseline roll angle including computing a first order corrected interferometer baseline roll angle at discrete points disposed at intervals which are short in relation to the quotient of the rate of change of the interferometer baseline roll angle with distance along the platform path divided by the speed of the moving platform employing said detected distance above the terrain of the moving platform of a corresponding adjacent platform path where the moving platform passed above the terrain imaged in said selected one of said first and second synthetic aperture complex image data, computing a first order corrected elevation for each resolution cell in a region surrounding each of said discrete points of first order corrected interferometer baseline roll angle computation employing said first order corrected interferometer baseline roll angle, computing a first order corrected ground range for each resolution cell in a region surrounding said discrete points of first order corrected interferometer baseline roll angle computation employing said first order corrected interferometer baseline roll angle; and computing a second order corrected elevation and ground range for each resolution cell corrected for the first return point of said radiant ranging sensor including determining the illuminated terrain within said predetermined beam width of said radiant beam for each of said discrete points of first order corrected interferometer baseline roll angle computation taking into account said first order corrected interferometer baseline roll angle, said region surrounding each of said discrete points of first order corrected interferometer baseline roll angle computation selected to include said illuminated terrain, determining the first return point of said illuminated terrain closest to said moving platform for each of said discrete points of first order corrected interferometer baseline roll angle computation, determining the elevation of said first return point of said illuminated terrain closest to the moving platform for each of said discrete points of first order corrected interferometer baseline roll angle computation, computing a second order corrected interferometer baseline roll angle for discrete points corresponding to said discrete points of first order corrected interferometer baseline roll angle computation employing said elevation of a corresponding first return point, computing a second order corrected elevation for each resolution cell employing a corresponding second order corrected interferometer baseline roll angle, and computing a second order corrected ground range for each resolution cell employing a corresponding second order corrected interferometer baseline roll angle.

19. A terrain mapping apparatus used with a moving platform having an axis of motion, said apparatus comprising:

a position detector disposed on the moving platform for repeatedly detecting the position of the moving platform;

a radiant ranging altimeter disposed on the moving platform for repeatedly detecting the distance above the terrain of the moving platform;

a first radar antenna disposed on the moving platform having a predetermined field of view off the axis of motion of the moving platform;

a second radar antenna disposed on the moving platform a predetermined distance from said first radar antenna having said predetermined field of view, said first and second radar antennas forming an interferometer baseline substantially perpendicular to the axis of motion;

a transmitter disposed on the moving platform and connected to at least one of said first and second antennas for repeatedly transmitting a radar signal via said at least one of said first and second antennas;

a first receiver disposed on the moving platform and connected to said first antenna for forming first synthetic aperture complex image data for plural resolution cells in slant range and Doppler frequency from reflections received by said first antenna employing plural transmitted radar signals;

a second receiver disposed on the moving platform and connected to said second antenna for forming second synthetic aperture complex image data for plural resolution cells in slant range and Doppler frequency from reflections received by said second antenna employing plural transmitted radar signals;

a phase detection means disposed on the moving platform and connected to said first and second receivers for determining the phase difference between said first and second synthetic aperture complex image data for each resolution cell;

a terrain map means connected to said position detector, said first receiver and said phase detection means for computing the elevation and ground range for each resolution cell within said first synthetic aperture complex image data for each of said set of platform paths employing the detected position of the moving platform and the phase difference between said first and second synthetic aperture complex image data for each resolution cell; and a terrain map first order correction means connected to said radiant ranging altimeter and said terrain map means for computing first order corrected elevation and ground range for each resolution cell for each of said set of platform paths employing said detected distance above the terrain of the moving platform for a corresponding adjacent platform path; and a terrain map second order correction means connected to said terrain map first order correction means for computing a second order corrected elevation and ground range for each resolution cell corrected for the first return point for said radiant ranging sensor, employing said first order corrected elevation and ground range for points of terrain near each of said corresponding adjacent platform paths.

20. The terrain mapping apparatus as claimed in claim 19, wherein:
said radiant ranging altimeter is a radar altimeter.

21. The terrain mapping apparatus as claimed in claim 19, wherein:
said radiant ranging altimeter is a laser altimeter.

22. The terrain mapping apparatus as claimed in claim 19, wherein:

said radiant ranging altimeter has a beam width greater than the expected variation in roll angle of the interferometer baseline.

23. The terrain mapping apparatus as claimed in claim 19, wherein:
said radiant ranging altimeter includes an altimeter circuit connected to said transmitter and to one of said first and second antennas for detecting the distance above the terrain of the moving platform by determining the time for the first echo return of a transmitted radar signal off the predetermined field of view of said one of said first and second antennas.

24. The terrain mapping apparatus as claimed in claim 19, further comprising:
an averaging means disposed on the moving platform and connected to said radiant ranging altimeter for averaging said detected distance above the terrain of the moving platform over a time small in relation to the product of the rate of change of altitude with distance along the axis of motion and the speed of the moving platform; and
wherein said terrain map first order correction means is further connected to said averaging means and is operative to compute said corrected elevation and ground range for each resolution cell employing sad average detected distance above the terrain of the moving platform.

25. The terrain mapping apparatus as claimed in claim 19, further comprising:
a multichannel recorder disposed on the moving platform and connected to said position detector, said ranging radiant altimeter, said first receiver and said phase detection means for recording said repeatedly detected position of the moving platform, said repeatedly detected distance above the terrain of the moving platform, said first synthetic aperture complex image data for each resolution cell and said phase difference between said first and second synthetic aperture complex image data for each resolution cell;
wherein said terrain map means is further connected to said multichannel recorder and is disposed remotely from the moving platform; and
wherein said terrain map correction means is disposed remotely from the moving platform.

26. The terrain mapping apparatus as claimed in claim 19, wherein:
said phase detection means includes
a complex conjugate means connected to said second receiver for forming the complex conjugate of said second synthetic aperture complex image data of each resolution cell,
a product means connected to said first receiver and said complex conjugate means for multiplying said complex conjugate of said second synthetic aperture complex image data of each resolution cell by said first synthetic aperture complex image data of the corresponding resolution cell, thereby forming a product signal for each resolution cell, and
a phase detector connected to said product means for determining the phase angle of said product signal for each resolution cell.

27. The terrain mapping apparatus as claimed in claim 19, wherein:
said radiant ranging altimeter has a predetermined beam width; and
said terrain map second order correction means is operative to
compute a first order corrected interferometer baseline roll angle for each point of said corresponding adjacent platform path,
determine the illuminated terrain within said predetermined beam width of said radiant beam for each point of said corresponding adjacent platform path taking into account said first order corrected interferometer baseline roll angle,
determine the first return point of said illuminated terrain closest to said moving platform for each point of said corresponding adjacent platform path,
determine the elevation of said first return point of said illuminated terrain closest to said moving platform for each point of said corresponding adjacent platform path,
compute a second order corrected interferometer baseline roll angle for each point of said corresponding adjacent platform path employing said elevation of a corresponding first return point, and
compute said second order corrected elevation and ground range for each resolution cell employing said second order corrected interferometer baseline roll angle.

28. The terrain mapping apparatus as claimed in claim 19, wherein:
said terrain map first order correction means is further operative to
compute a first order corrected interferometer baseline roll angle at discrete intervals which are short in relation to the quotient of the time rate of change of the interferometer baseline roll angle divided by the speed of the moving platform,
compute said first order corrected elevation for each resolution cell using the corresponding computed first order corrected interferometer baseline roll angle, and
compute said first order corrected ground range for each resolution cell using the corresponding computed first order corrected interferometer baseline roll angle; and
said terrain map second order correction means is further operative to
determine the illuminated terrain within said predetermined beam width of said radiant beam for each of said discrete points of first order corrected interferometer baseline roll angle computation taking into account said first order corrected interferometer baseline roll angle, said region surrounding each of said discrete points of first order corrected interferometer baseline roll angle computation selected to include said illuminated terrain,
determine the first return point of said illuminated terrain closest to said moving platform for each of said discrete points of first order corrected interferometer baseline roll angle computation,
determine the elevation of said first return point of said illuminated terrain closest to said moving platform for each of said discrete points of first order corrected interferometer baseline roll angle computation,
compute a second order corrected interferometer baseline roll angle for discrete points corresponding to said discrete points of first order corrected interferometer baseline roll angle computation employing said elevation of a corresponding first return point, compute a second order corrected elevation for each point of terrain employing a corresponding second order corrected interferometer baseline roll angle, and compute a second order corrected ground range for each point of terrain employing a corresponding second order corrected interferometer baseline roll angle.

29. The terrain mapping apparatus as claimed in claim 19, wherein:

said terrain map first order correction means is further operative to compute the first order corrected interferometer baseline roll angle at discrete intervals, compute said first order corrected elevation for each resolution cell using the corresponding computed first order corrected interferometer baseline roll angle for resolution cells at said discrete intervals, compute said first order corrected ground range for each resolution cell using the corresponding computed first order corrected interferometer baseline roll angle for resolution cells at said discrete intervals; and said terrain map second order correction means is further operative to determine the illuminated terrain within said predetermined beam width of said radiant beam for each of said discrete points of first order corrected interferometer baseline roll angle computation taking into account said first order corrected interferometer baseline roll angle, aid region surrounding each of said discrete points of first order corrected interferometer baseline roll angle computation selected to include said illuminated terrain, determine the first return point of said illuminated terrain closest to said moving platform for each of said discrete points of first order corrected interferometer baseline roll angle computation, determine the elevation of said first return point of said illuminated terrain closest to said moving platform for each of said discrete points of first order corrected interferometer baseline roll angle computation, compute the second order corrected interferometer baseline roll angle at said discrete intervals, compute said second order corrected elevation for each resolution cell using the corresponding computed second order corrected interferometer baseline roll angle for resolution cells at said discrete intervals, compute said second order corrected elevation for each resolution cell using an interpolation of said computed second order corrected interferometer baseline roll angle at discrete intervals for resolution cells between said discrete intervals, compute said second order corrected ground range for each resolution cell using the corresponding computed second order interferometer baseline roll angle for resolution cells at said discrete intervals, and compute said second order corrected ground range for each resolution cell using an interpolation of said computed second order interferometer baseline roll angle at discrete intervals for resolution cells between said discrete intervals.

30. The terrain mapping apparatus as claimed in claim 19, further comprising:

a transmit/receive switch connected to said first antenna, said transmitter and said first receiver for alternately coupling said transmitter to said first antenna for transmitting a radar pulse and coupling said first receiver to said first antenna for forming first synthetic aperture complex image data from reflections received by said first antenna.

31. The terrain mapping apparatus as claimed in claim 30, wherein:

said terrain map first order correction means is operative to compute a first order corrected interferometer baseline roll angle according to $$\alpha = \cos^{-1}\left(\frac{h'}{R}\right) - \sin^{-1}\left(\frac{\Delta\phi\lambda}{2\pi B}\right)$$

where $\alpha$ is the first order corrected interferometer baseline roll angle to be computed, R is the slant range to a particular point during said platform path, h' is the measured altitude of the moving platform above the particular point during said corresponding adjacent platform path, $\Delta\phi$ is the phase difference measured between said first and second synthetic aperture complex images of the particular point during said platform path, $\Delta\phi$ is the phase difference detected by said phase detection means, $\lambda$ is the average wavelength of said transmitted radar signal, and B is said predetermined distance between said first and second antennas, compute said first order corrected elevation as $$a' = a - R\cos\left\{\alpha + \sin^{-1}\left(\frac{\Delta\phi\lambda}{2\pi B}\right)\right\}$$

where a' is said first order corrected elevation to be computed and a is the elevation of the moving platform when following said corresponding adjacent platform path above said particular point, and compute said first order corrected ground range as $$d = R\sin\left\{\alpha + \sin^{-1}\left(\frac{\Delta\phi\lambda}{2\pi B}\right)\right\}$$

where d is said first order corrected ground range to be computed;

said terrain map second order correction means is operative to compute a second order corrected interferometer baseline roll angle according to $$\alpha' = \cos^{-1}\left(\frac{h''}{R}\right) - \sin^{-1}\left(\frac{\Delta\phi\lambda}{2\pi B}\right)$$

where $\alpha'$ is the second order corrected interferometer baseline roll angle to be computed,
compute said second order corrected elevation as $$a'' = a - R\cos\left\{\alpha' + \sin^{-1}\left(\frac{\Delta\phi\lambda}{2\pi B}\right)\right\}$$

where $a''$ is said second order corrected elevation to be computed and $a$ is the elevation of the moving platform when following said corresponding adjacent platform path above said first return point, and
compute said second order corrected ground range as $$d' = R\sin\left\{\alpha' + \sin^{-1}\left(\frac{\Delta\phi\lambda}{2\pi B}\right)\right\}$$

where $d'$ is said second order corrected ground range to be computed.

32. The terrain mapping apparatus as claimed in claim 19, further comprising:
an antenna selection switch having an input connected to said transmitter and first and second outputs for alternately connecting said transmitter to said first and second outputs;
a first transmit/receive switch connected to said first antenna, said first receiver and said antenna selection switch for alternately coupling said antenna selection switch to said first antenna for transmitting a radar pulse and coupling said first receiver to said first antenna for forming first synthetic aperture complex image data from reflections received by said first antenna; and
a second transmit/receive switch connected to said second antenna, said second receiver and said antenna selection switch for alternately coupling said antenna selection switch to said second antenna for transmitting a radar pulse and coupling said second receiver to said second antenna for forming second synthetic aperture complex image data from reflections received by said second antenna.

33. The terrain mapping apparatus as claimed in claim 32, wherein:
said terrain map first order correction means is operative to
compute a first order corrected interferometer baseline roll angle according to $$\alpha = \cos^{-1}\left(\frac{h'}{R}\right) - \sin^{-1}\left(\frac{\Delta\phi\lambda}{4\pi B}\right)$$

where $\alpha$ is the first order corrected interferometer baseline roll angle to be computed, R is the slant range to a particular point during said platform path, $h'$ is the measured altitude of the moving platform above the particular point during said corresponding adjacent platform path, $\Delta\phi$ is the phase difference measured between said first and second synthetic aperture complex images of the particular point during said platform path, $\Delta\phi$ is the phase difference detected by said phase detection means, $\lambda$ is the average wavelength of said transmitted radar signal, and B is said predetermined distance between said first and second antennas,
compute said first order corrected elevation as $$a' = a - R\cos\left\{\alpha + \sin^{-1}\left(\frac{\Delta\phi\lambda}{4\pi B}\right)\right\}$$

where $a'$ is said first order corrected elevation to be computed and $a$ is the elevation of the moving platform when following said corresponding adjacent platform path above said particular point, and
compute said first order corrected ground range as $$d = R\sin\left\{\alpha + \sin^{-1}\left(\frac{\Delta\phi\lambda}{4\pi B}\right)\right\}$$

where $d$ is said first order corrected ground range to be computed;
said terrain map second order correction means is operative to
compute a second order corrected interferometer baseline roll angle according to $$\alpha' = \cos^{-1}\left(\frac{h''}{R}\right) - \sin^{-1}\left(\frac{\Delta\phi\lambda}{4\pi B}\right)$$

where $\alpha'$ is the second order corrected interferometer baseline roll angle to be computed,
compute said second order corrected elevation as $$a'' = a - R\cos\left\{\alpha' + \sin^{-1}\left(\frac{\Delta\phi\lambda}{4\pi B}\right)\right\}$$

where $a''$ is said second order corrected elevation to be computed and $a$ is the elevation of the moving platform when following said corresponding adjacent platform path above said first return point, and
compute said second order corrected ground range as $$d' = R\sin\left\{\alpha' + \sin^{-1}\left(\frac{\Delta\phi\lambda}{4\pi B}\right)\right\}$$

where $d'$ is said second order corrected ground range to be computed.

* * * * *